(12) United States Patent
Chen et al.

(10) Patent No.: US 9,007,435 B2
(45) Date of Patent: Apr. 14, 2015

(54) REAL-TIME DEPTH-AWARE IMAGE ENHANCEMENT SYSTEM

(75) Inventors: Liang-Gee Chen, Tainan (TW);
Chung-Te Li, Tainan (TW);
Chao-Chung Cheng, Tainan (TW);
Yen-Chieh Lai, Tainan (TW);
Ling-Hsiu Huang, Tainan (TW)

(73) Assignees: Himax Technologies Limited, Tainan (TW); National Taiwan University, Taipei (TW)

( * ) Notice: Subject to any disclaimer, the term of this patent is extended or adjusted under 35 U.S.C. 154(b) by 796 days.

(21) Appl. No.: 13/109,310

(22) Filed: May 17, 2011

(65) Prior Publication Data

US 2012/0293615 A1 Nov. 22, 2012

(51) Int. Cl.
*G06T 15/20* (2011.01)
*G06T 5/00* (2006.01)

(52) U.S. Cl.
CPC .............. *G06T 15/205* (2013.01); *G06T 5/003* (2013.01); *G06T 2207/20012* (2013.01); *G06T 2207/20192* (2013.01)

(58) Field of Classification Search
None
See application file for complete search history.

(56) References Cited

U.S. PATENT DOCUMENTS

| | | | | |
|---|---|---|---|---|
| 7,215,376 B2 * | 5/2007 | Adams et al. | | 348/452 |
| 7,711,201 B2 * | 5/2010 | Wong et al. | | 382/254 |
| 7,821,570 B2 * | 10/2010 | Gallagher et al. | | 348/364 |
| 8,253,729 B1 * | 8/2012 | Geshwind | | 345/419 |
| 8,520,935 B2 * | 8/2013 | Wang et al. | | 382/154 |
| 8,643,701 B2 * | 2/2014 | Nguyen et al. | | 348/47 |
| 2005/0220358 A1 * | 10/2005 | Blonde et al. | | 382/264 |
| 2006/0104535 A1 * | 5/2006 | Varekamp | | 382/260 |
| 2009/0148062 A1 * | 6/2009 | Gabso et al. | | 382/266 |
| 2010/0080448 A1 * | 4/2010 | Tam et al. | | 382/154 |
| 2011/0032333 A1 * | 2/2011 | Neuman et al. | | 348/43 |
| 2011/0069152 A1 * | 3/2011 | Wang et al. | | 348/43 |
| 2011/0074920 A1 * | 3/2011 | Tsukagoshi | | 348/43 |

OTHER PUBLICATIONS

Guo et al, "2D to 3D Conversion based on Edge Defocus and Segmentation", Proc. of 2008 Int'l Conf. on Acoustics, Speech and Signal Processing, Mar. 30-Apr. 4, 2008, Las Vegas, Nevada, U.S.A., pp. 2181-2184.*
Wei, "Converting 2D to 3D: A Survey", Information and Communication Theory Group, Faculty of Electrical Engineering, Mathematics and Computer Science, Delft University of Technology, the Netherlands, Dec. 2005.*
Li et al, "A Real-Time Image Enhancement System Using Depth From Edge", Proc. Int'l Conf. on 3D Systems and Applications (3DSA 2010), May 19-21, 2010, Tokyo, Japan.*
Paris et al., "Bilateral Filtering: Theory and Applications," Foundations and Trends in Computer Graphics and Vision, vol. 4, No. 1, pp. 1-73, 2008.*
Guo et al., "2D to 3D Conversion Based on Edge Defocus and Segmentation," Proc. IEEE Conf. on Acoustics, Speech and Signal Processing (ICASSP 2008), pp. 2181-2184, Mar. 30-Apr. 4, 2008.*

(Continued)

*Primary Examiner* — Jay Patel
*Assistant Examiner* — Reza Aghevli
(74) *Attorney, Agent, or Firm* — Su IP Counsulting

(57) ABSTRACT

An example process to enhance a two-dimensional (2D) image may include generating a depth map for the 2D image based on edges detected from the 2D image, wherein the depth map can be used to convert the 2D image to a 3D image. The process may further include enhancing the 2D image using the depth map.

13 Claims, 4 Drawing Sheets

(56) References Cited

OTHER PUBLICATIONS

Wei, "Converting 2D to 3D: A Survey," Information and Communication Theory Group, Faculty of Electrical Engineering, Mathematics and Computer Science, Delft University of Technology, the Netherlands, Dec. 2005.*

Zhang et al., "Adaptive Bilateral Filter for Sharpness Enhancement and Noise Removal," IEEE Trans. on Image Processing, vol. 17, No. 5, pp. 664-678, May 2008.*

Tomasi et al., "Bilateral Filtering for Gray and Color Images," Sixth Int'l Conf. on Computer Vision, pp. 839-846, Jan. 4-7, 1998.*

Fehn, "Depth-Image-Based Rendering (DIBR), Compression and Transmission for a New Approach to 3D-TV," Proc. of SPIE-IS&T Electronic Imaging, SPIE vol. 5291, pp. 93-104, 2004.*

Chen et al., "Efficient Depth Image Based Rendering with Edhe Dependent Depth Filter and Interpolation," IEEE Int'l Conf. on Multimedia and Expo, pp. 1314-1317, Jul. 6, 2005.*

Shum et al, "Survey of Image-Based Representations and Compression Techniques," IEEE Trans. on Circuits and Systems for Video Technology, vol. 13, No. 11, Nov. 2003.*

Zhang et al, "A Survey of Image-Based Rendering," Electrical and Computer Engineering, Carnegie Mellon University, Tech. Report AMP 03-03, Jun. 2003.*

Chung-Te Li, et al., "A Real-Time Image Enhancement System Using Depth from Edge," International Conference on 3D systems and Applications (3DSA 2010), Tokyo, Japan, May 2010.

\* cited by examiner

REAL-TIME DEPTH-AWARE IMAGE ENHANCEMENT SYSTEM

BACKGROUND OF THE DISCLOSURE

1. Field of the Disclosure

Embodiments of the present disclosure relate generally to display technologies and more specifically to real-time depth-aware image enhancement systems and methods.

2. Description of the Related Art

Unless otherwise indicated herein, the approaches described in this section are not prior art to the claims in this application and are not admitted to be prior art by inclusion in this section.

Image enhancement processes may be utilized to improve the visual appearance and/or quality of monoscopic images or videos. Conventional image enhancement techniques perform their respective enhancement operations within the two-dimensional (2D) projective plane (e.g., the x-y plane) of the image. The monoscopic images or videos do not contain information describing a third dimension (depth), and the process of extracting depth information from the monoscopic images or videos is generally complex and time-consuming. As a result, conventional approaches do not take the depth information into consideration to carry out image enhancement operations.

SUMMARY

In accordance with one or more embodiments of the present disclosure, a process for enhancing a two-dimensional (2D) image may be presented. The process may be implemented to generate a depth map for the 2D image based on edges detected from the 2D image, wherein the depth map can be used to convert the 2D image to a three-dimensional (3D) image. The process may further be implemented to enhance the 2D image using the depth map In accordance with other embodiments of the present disclosure, a process for enhancing a 2D video may be present. The process may be implemented to extract a 2D image from the 2D video, generate a depth map associated with the 2D image, de-interlace the 2D image to generate a de-interlaced 2D image, and perform noise reduction on the de-interlaced 2D image to generate a noise-reduced 2D image. The process may further be implemented to perform contrast enhancement on the noise-reduced 2D image to generate a contrast-enhanced 2D image using the depth map, perform color enhancement on the contrast-enhanced 2D image to generate a color-enhanced 2D image using the depth map, perform sharpness enhancement on the color-enhanced 2D image to generate a sharpness-enhanced 2D image, and perform scaling on the sharpness-enhanced 2D image to generate an enhanced 2D image.

In accordance with further embodiments of the present disclosure, a system may be configured to enhance a two-dimensional (2D) video. The system may contain a video decoder for extracting a 2D image from the 2D video. The system may further contain a depth map generator coupled with the video decoder for generating a depth map based on the 2D image, wherein the depth map is suitable for converting the 2D image to a 3D image; and a video post-processor coupled with the video decoder and the depth map generator for enhancing the 2D image using the depth map.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
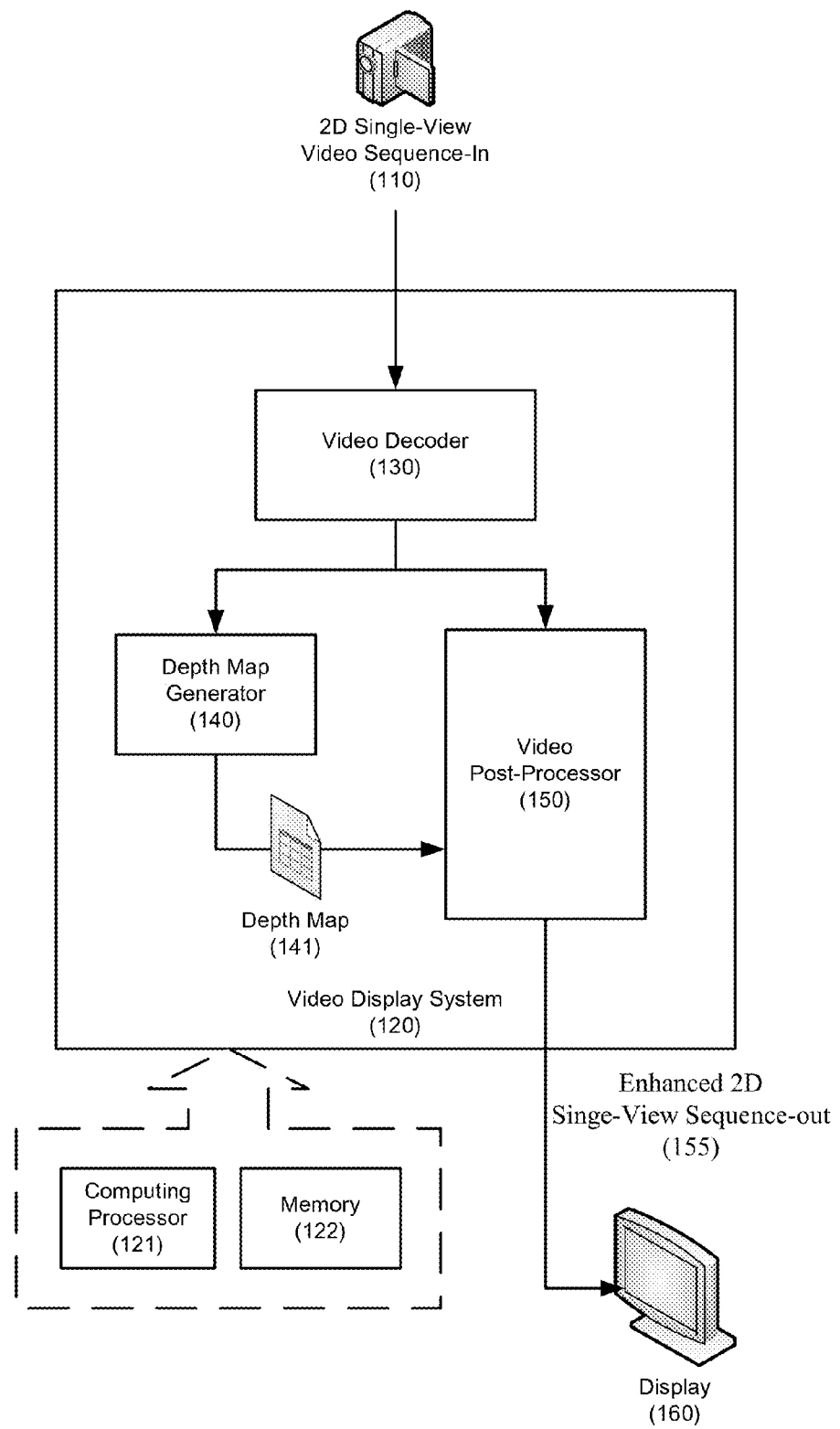
FIG. 1 shows a block diagram of an illustrative embodiment of a system configured to perform 2D image enhancement operations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatus, computer programs and systems related to the enhancing of an image using a depth map. In one embodiment, a video display system may extract a 2D image from a 2D video. The video display system may process the 2D image and generate a depth map. Even though the depth map can be used to convert the 2D image to a 3D image, the depth map is used to enhance the same 2D image from which the depth map is generated. To generate the depth map, a depth generator of the video display system may detect edges from the 2D image, and map the detected edges to depth values in the depth map. A video post-processor of the video display system may perform depth-aware enhancements on the 2D image using the depth map.

Throughout the disclosure, the term "depth map" may broadly refer to a data structure that contains depth values, or information relating to the distance of the surfaces of objects from a viewpoint. A 2D image may be captured from a particular viewpoint. The 2D image may be analyzed to estimate the depth values associated with the pixels in the 2D image. Each depth value may relate to a distance from a pixel of an object to the viewpoint. For example, the further away the object is from the viewpoint, the larger the distance, and hence the depth value, is between the object and the viewpoint. The depth values for all the pixels in the 2D image may then be stored in the depth map. For example, if the 2D image has a resolution of 1024×768, the depth map may also include 1024×768 corresponding depth values for the pixels in the 2D image.

FIG. 1 shows a block diagram of an illustrative embodiment of a system configured to perform 2D image enhancement operations. In particular, a video display system 120 may be configured to process a 2D single-view video sequence-in 110 ("2D video 110") and generate a set of enhanced 2D single-view video sequence-out 155 for a display 160 to display. The video display system 120 may be configured to include, without limitation, a video decoder 130, a depth map generator 140, a video post-processor 150, a computing processor 121, and/or a memory 122. The depth map generator 140 may generate a depth map 141 based on a 2D image, and the video post-processor 150 may utilize the generated depth map 141 to enhance the 2D image.

In some embodiments, the 2D video 110 may correspond to a video stream generated by 2D video capturing devices such as camcorders or a video stream converted from a 2D movie. The 2D video 110 may contain a sequence of image frames, each of which may include a still 2D single-view color image. Such a 2D single-view image may contain monoscopic imaging data that does not have depth information, and thus cannot be directly used to show 3D effect without further processing. Each 2D image may have multiple color pixels configured based on a specific resolution. For example, a 2D image may have a 1024×768 resolution, meaning that the 2D image has 768 horizontal image lines, each of the image lines having 1024 pixels of color information. Other popular image resolutions may include, without limitation, 640×480, 1280×1024, or 1920×1200. In some embodiments, the 2D video 110 may be in a compressed and encoded format such as, without limitation, MPEG-2.

In some embodiments, the video decoder 130 may decompress and decode the 2D video 110 and extract a set of 2D images from the 2D video 110. The extracted 2D image may then be transmitted to the depth map generator 140 and the video post-processor 150 for further processing. The 2D images may be stored in a frame buffer (not shown in FIG. 1), which may allow the depth map generator 140 and the video post-processor 150 to quickly access these 2D images.

In some embodiments, the video post-processor 150 may be configured to receive the specific 2D image from the video decoder 130, the corresponding depth map 141 from the depth map generator 140, and perform image enhancement operations on the 2D image based on the depth map 141. The video display system 120 may perform the above operations in real-time and generate a set of enhanced 2D images from the 2D video 110. The set of enhanced 2D images may then be included as the 2D single-view video sequence-out 155, which may then be displayable on the display 160. The details of the depth map generator 140 and the video post-processor 150 are further described below.

In some embodiments, the video display system 120 may utilize the computing processor 121 for performing the decoding of the 2D video 110, the generating of the depth map 141, and/or the enhancing of the 2D images. The computing processor 121 may be a microprocessor or any general or specific computing device that executes commands based on programmable instructions. In some embodiments, the computing processor 121 may utilize the memory 122 to execute the programmable instructions and store the intermediate processing results of the execution. The memory 122 may be in any form of random access memory (RAM), read-only memory (ROM), flash memory, conventional magnetic or optical disks, tape drives, or a combination of such devices.

The display 160 may be a 2D or a 3D display device, which may include, without limitation, a computer monitor, a device screen, a television, or a projector. In some embodiments, the depth map generator 140 and the video post-processor 150 may perform their respective operations in parallel. For example, the depth map generator 140 may generate a first depth map from a first 2D image. When the video post-processor 150 is using the first depth map to enhance the first 2D image, the depth map generator 140 may in-parallel generate a second depth map from a second 2D image. The details about the optimized and/or parallel processing are further described below.

Figure 2:
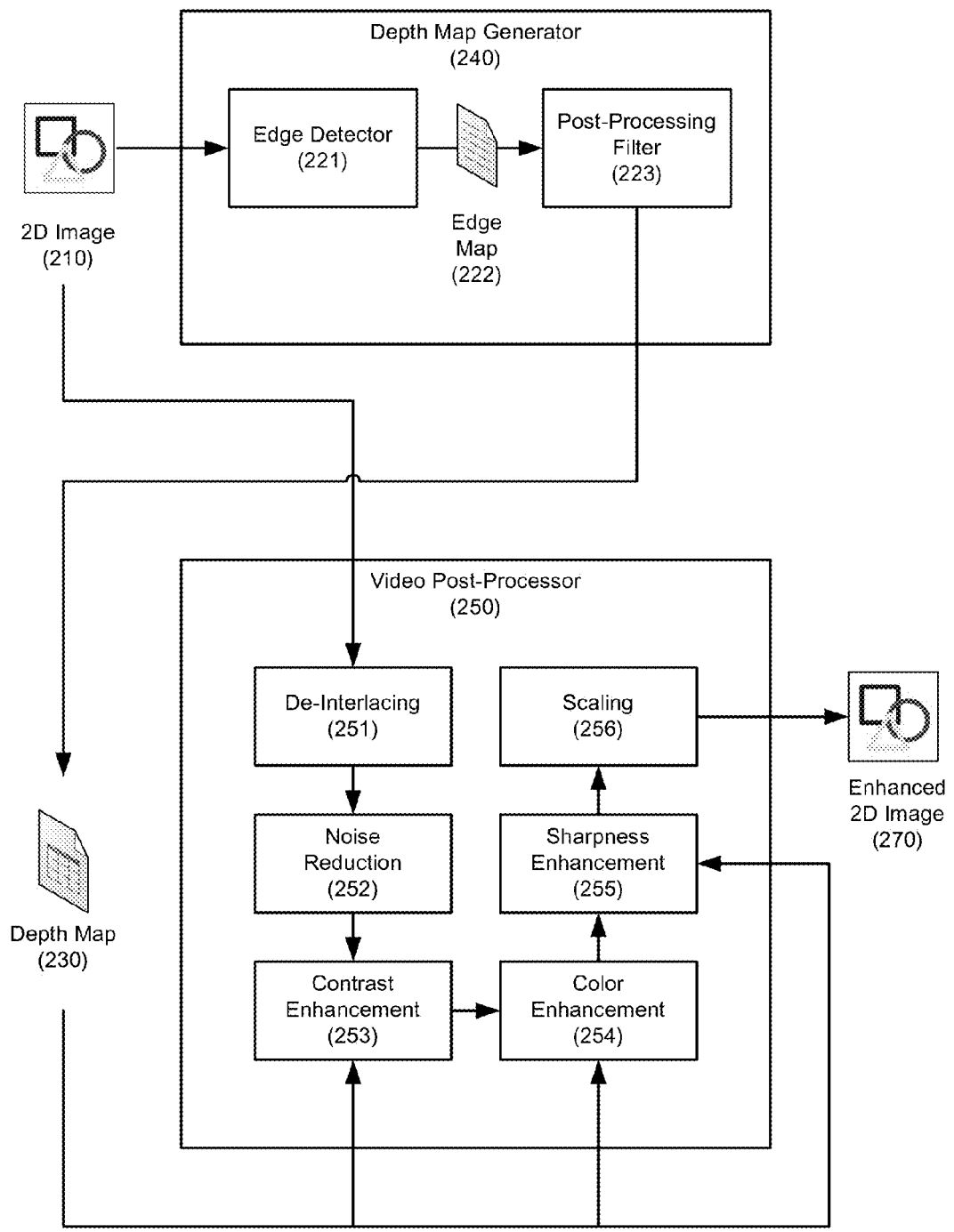
FIG. 2 shows illustrative embodiments of a depth map generator configured to generate a depth map and a video post-processor configured to enhance 2D images based on the depth map.

FIG. 2 shows illustrative embodiments of a depth map generator configured to generate a depth map and a video post-processor configured to enhance 2D images based on the depth map. In FIG. 2, a depth map generator 240 (similar to the depth map generator 140 of FIG. 1) may contain an edge detector 221 and a post-processing filter 223. A video post-processor 250 (similar to the video post-processor 150 of FIG. 1) may contain, among other things, a de-interlacing module 251, a noise reduction module 252, a contrast enhancement module 253, a color enhancement module 254, a sharpness enhancement module 255, and/or a scaling module 256.

In some embodiments, the edge detector 221 may process a 2D image 210 to generate an edge map 222. The post-processing filter 223 may process the edge map 222 to generate a depth map 230. Although the 2D image 210 does not contain depth information for each of its pixels, other information, such as depth cues, may be detected from the 2D image 210 to generate the depth map 230. Some example depth cues include, without limitation, motion parallax, texture, familiar size, defocus, and/or geometric perspective. The depth map 230 for visual quality enhancement may have additional requirements comparing to a depth map for reconstructing 3D scenes. For example, the suitable depth cues for image enhancement should be stable in temporal axis, have a high probability of effectiveness in majority of the situations, and produce less side-effect during enhancement operations.

In some embodiments, defocus and geometric perspectives may be the suitable depth cues for determining depth information and generating the depth map 230. The depth cues based on defocus may be useful in evaluating the degree of image blur in the 2D image 210 and determining depth information. Using such depth cues may also result in less side-effect in the enhanced 2D image. Moreover, the depth cues based on geometric perspectives may be useful in detecting the geometric shapes and edges in the 2D image 210 and determining depth information.

In some embodiments, determining depth information from the 2D image 210 may include an edge (i.e., sharpness) detection operation and a depth assignment operation. The edge detector 221 may detect edge information in the 2D image 210 and generate the edge map 222 that includes the detected edge information. The edge detector 221 may utilize a high frequency filter such as a Sobel filter for edge detection. The Sobel filter may calculate the gradient of the image intensity at each pixel position in the 2D image 210. The gradient information may show how smooth or abrupt the image changes at each pixel position, indicating the possibility that the image changes may represent an edge. The edge map 222 may include the edge values, which are derived from the gradient values, for all the pixels in the 2D image 210.

In some embodiments, the post-processing filter 223 may perform the depth assignment operation to generate the depth map 230 based on the edge values in the edge map 222. In the edge map 222, a weak edge value for a particular pixel position may indicate a further distance away from a focus plane from the pixel at the particular pixel position. In other words, assuming the edge values in the edge map 222 may be normally distributed in each depth layer, the variance of the edge strengths in the edge map 222 may be larger when the location of the corresponding pixels are closer to a focus plane. Therefore, the stronger edges may be more meaningful when mapping the edges to depth information.

In some embodiments, the post-processing filter 223 may generate a weighted depth map based on the distribution of the edges in the edge map 222. The post-processing filter 223 may then apply a weighted low-pass filter to the weighted depth map to generate an estimated depth map. Then, the post-processing filter 223 may filter the estimated depth map using a cross-bilateral filter to generate the depth map 230. The details of the above operations are further described below.

In some embodiments, a weighted depth map (denoted by $\hat{C}$) may be generated based on the distribution of the edges in the edge map 222. A probability map E may be generated and utilized to calculate the weighted depth map in the following manner:

$$\hat{C}(x, y) = f\left(\left|\frac{E(x, y) - \text{mean}(\{E\})}{\text{std}(\{E\})}\right|\right)$$

where f is a probability distribution function of the edge map 222.

In some embodiments, the probability distribution function f is suggested to be an increasing (e.g., also continuous and smooth) function. From the perspectives of both the computational efficiency and the quality of the depth map, f is selected as a biased inverse normal distribution, which is shown in the following:

$$f(x) = \text{Normal}_{0,1}(0) - \text{Normal}_{0,1}(x)$$

where the $\text{Normal}_{0,1}$ means zero-mean and uni-variance normal distribution. The weighting shown above is mainly based on the Bayesian Theory.

In some embodiments, the post-processing filter 223 may apply a weighted low-pass filter to the weighted depth map to generate an estimated depth map (denoted as $D_{edge}(x,y)$). Specifically, the depth from edge can be estimated by applying the weighted low-pass filter to the weighted edge map based on color similarity, as shown below:

$$D_{edge}(x, y) = \frac{\sum_{(x_j, y_j) \in N(x,y)} \hat{C}(x, y) e^{-|I(x,y) - I(x_j, y_j)|} E(x, y)}{\sum_{(x_j, y_j) \in N(x,y)} C(x, y) e^{-|I(x,y) - I(x_j, y_j)|}}$$

where N is a neighbor of (x,y).

The formulas shown above may provide a heuristic estimation of the probability. An estimated depth map for the following image enhancement operations may be generated.

In some embodiments, the depth map 230 (denoted as $D_{filtered}$) may be generated by filtering the estimated depth map using a cross-bilateral filter (denoted as K), as shown below:

$$D_{filtered}(x_i) = \frac{1}{K(x_i)} \sum_{x_j \subset N(x_i)} e^{-\frac{|x_j - x_i|^2}{2\sigma_s^2}} e^{-\frac{|u(x_j) - u(x_i)|^2}{2\sigma_r^2}} D_{fused}(x_j)$$

$$K(x_i) = \sum_{x_j \subset N(x_i)} e^{-\frac{|x_j - x_i|^2}{2\sigma_s^2}} e^{-\frac{|u(x_j) - u(x_i)|^2}{2\sigma_r^2}}$$

In some embodiments, with the depth map 230, the video post-processor 250 may perform a sequence of operations on the 2D image 210. Specifically, the de-interlacing module 251 may convert the interlaced 2D image 210 into a non-interlaced form. The noise-reduction module 252 may reduce the noise in the 2D image 210. The contrast enhancement module 253 may enhance the contrast of the 2D image 210. The color enhancement module 254 may enhance the color of the 2D image 210. The sharpness enhancement module 255 may enhance the sharpness of the 2D image 210. The scaling module 256 may enlarge or diminish all or a part of the 2D image 210. It should be noted that the aforementioned sequence of operations may be carried out in a different order, or some of the operations may be optional.

In some embodiments, the video post-processor 250 may perform depth-aware enhancements by adjusting the contrast, color, and/or sharpness of the 2D image 210 using the depth map 230.

In some embodiments, the contrast enhancement module 253 may perform depth-adaptive kernel-size enhancement to the high frequency components of the 2D image 210. One characteristic of the human depth perception is that for a part of the 2D image 210, the nearer the image is toward a viewer, the stronger the contrast the viewer perceives. Thus, in one implementation, contrast may be enhanced by an increasing function of depth:

$$\text{Image}_{contrast\_en}(x) = \text{Image}(x) + (\text{Depth}(x)) \times \text{HPF}(\text{Image}(x))$$

That is, for a specific pixel in the 2D image 210, an enhancement contrast value (denoted Image$_{contrast\_en}$ (x)) is generated by adding an enhancement value to the original contrast value (denoted Image(x)). The enhancement value is calculated by applying a high-pass filter (denoted HPF) to the original contrast value of the pixel, and the filtered contrast value is then multiplied with the depth value (denoted Depth (x)), which is extracted from the depth map 230 and associated with the specific pixel. As shown in one example embodiment, the depth-aware enhancement may be accomplished by applying a simple linear increasing function of depth to the high frequency component of the 2D image 210. The enhancement provides a sharp contour and texture for nearer objects, thereby enhances the depth perception of the 2D image 210.

In some embodiments, the color enhancement module 254 may enhance color based on light detected in the 2D image 210. Generally; objects that are further away from a viewpoint may have lower color saturation due to light scattering by the atmosphere. This phenomenon is due to the characteristics of the aerial perspective. The total light perceived by a viewer of the 2D image 210 may be separated into two parts. The first part is the light directly coming from the object. Such light may be denoted as Light$_{object}$, which is likely to degrade exponentially as the depth increases. The second part may be the ambient light (denoted as Light$_{ambient}$) from the surrounding environment. Thus, the light observed by a viewer of the 2D image 210 may be the combination of these two light sources Light$_{object}$ and Light$_{ambient}$. For simplicity, the ambient light Light$_{ambient}$ may be deemed white in the following algorithms. In addition, the further the object is, the weaker the saturation of the combined light is. Thus, the saturation can be also enhanced by an increasing linear function of depth:

$$Light_{object}(depth)=c \times Light_{object}(0) * e^{-depth}$$

In some embodiments, the color enhancement module 254 may first determine a $Light_{ambient}$ for the 2D image 210. The $Light_{ambient}$ value may be determined by identifying the lowest light level in the 2D image 210. The lowest light level may be estimated by selecting a group of pixels from the 2D image 210 having low light values relative to the rest of pixels in the 2D image 210, and calculating a mean/medium light level based on these low light values. Afterward, a percentage (e.g., 10%) of the mean/medium light level may be deemed the $Light_{ambient}$.

The depth map 230 may then be used to determine a point in the 2D image 210 that is closest to the viewpoint. That is, by evaluating and comparing the depth values for the pixels of the 2D image 210, the pixel that has the smallest depth value may be deemed the point that is closest to the viewpoint, and may be denoted as $Light_{object}(0)$. The $Light_{object}(0)$ may be used as a baseline value in the subsequent operations.

In some embodiments, the depth values in the depth map 230 may be adjusted to further enhance the depth characteristic of the 2D image 210. For a depth value (ranging from 0-255, for example) from the depth map 230, if the depth value is equal to 128 (which is in the middle of the range 0-255), then the depth value may remain unadjusted. If the depth value is closer than 128 but less than 128, then the closer the pixel is to the viewpoint of the 2D image 210, the more adjustment may be applied to the depth value to make the depth value smaller. If the depth value is further away than 128 (larger than 128), then the further the pixel is from the viewpoint of the 2D image 210, the more adjustment it may be applied to the depth value to make the depth value larger.

Using the adjustment process described above, for each depth value in the depth map 230, the adjusted depth value (denoted aDepth) may be calculated as below, and may be used to adjust the light value:

$$Light_{object}(aDepth)=c * Light_{object}(0) * e^{aDepth}$$

Afterward, for each pixel in the 2D image 210, the enhanced light level for the pixel ($Light_{total}$) may be calculated as the following $$Light_{total}=Light_{object}(aDepth)+Light_{ambient}$$

Thus, for color enhancement, the saturation channel of HVS color space may be adjusted to represent that the object is closer to the viewer. Therefore, the saturation of an image may be enhanced by an increasing function of depth. The relationship between scattering and depth may be modeled as an exponential function. In other words, the above operations for the color enhancement of the 2D image 210 may be summarized as the following:

$$Saturation_{enhanced}(x)=Saturation(x) \times (\beta(Depth(x)))$$

Specifically, the $\beta(Depth(x))$ may be the color enhancement function that is based on the depth map 230.

In some embodiments, the sharpness enhancement module 255 may perform similar enhancement using the depth map 230, similar to the contrast enhancement and the color enhancement described above.

In some embodiments, the scaling module 256 may perform scaling on the 2D image and generate an enhanced 2D image 270, which may be used as a part of 2D single-view video sequence-out.

Figure 3:
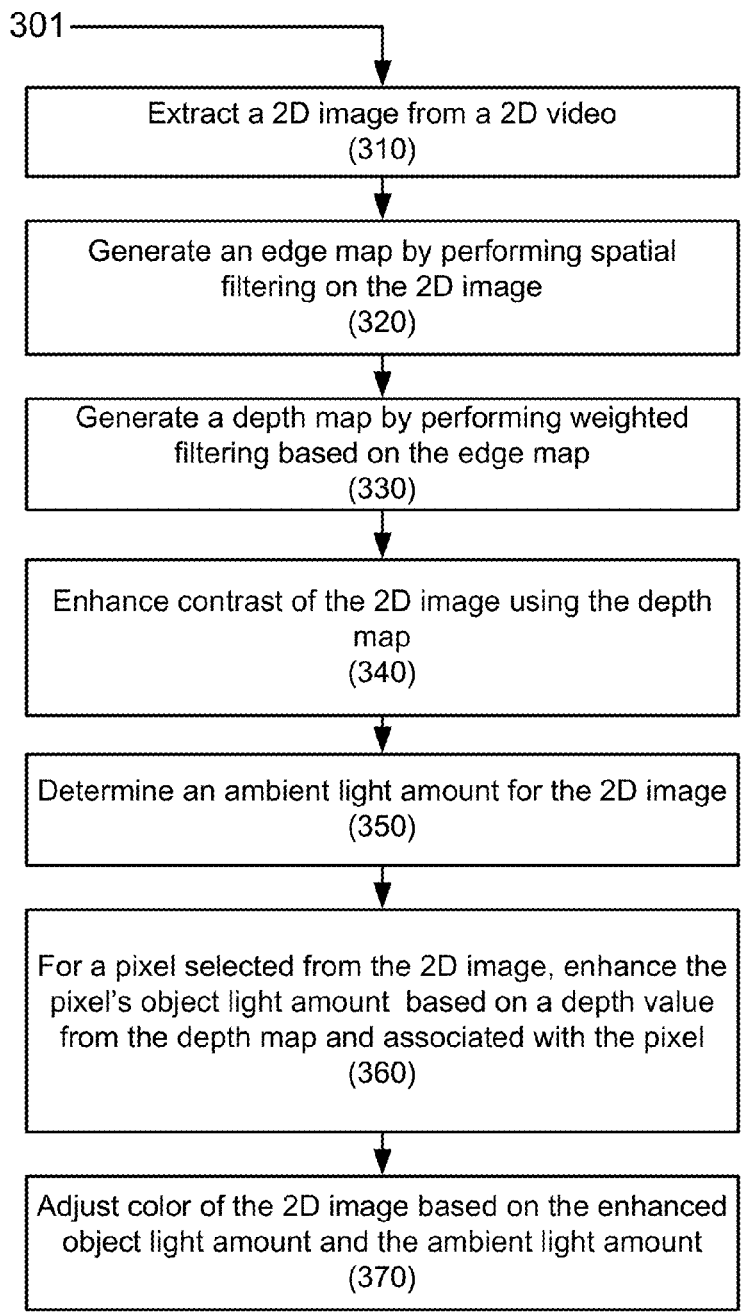
FIG. 3 shows a flow diagram of an illustrative embodiment of a process for generating a depth map and enhancing a 2D image.

FIG. 3 shows a flow diagram of an illustrative embodiment of a process 301 for generating a depth map and enhancing a 2D image. The process 301 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations. In some embodiments, machine-executable instructions for the process 301 may be stored in memory, executed by a processing unit, and/or implemented in a video display system 120 of FIG. 1.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, a video decoder of a video display system may receive a 2D video as inputs, which may be a sequence of single-view video frames. The video decoder may decode the 2D video and extract one or more 2D images from the 2D video. At block 320, the 2D image may be transmitted to a depth map generator of the video display system, and an edge detector of the depth map generator may generate an edge map by performing spatial filtering on the 2D image. Specifically, the depth map generator may utilize a high frequency filter such as a Sobel filter for detecting edge information, and storing the detected edge information in the edge map.

At block 330, the depth map generator may generate a depth map by performing weighted filtering based on the edge map. Specifically, a post-processing filter of the depth map generator may generate a weighted depth map based on a probability distribution of the edges in the edge map. The depth map generator may then apply a weighted low-pass filter to the weighted depth map to generate an estimated depth map. Afterward, the depth map generator may filter the estimated depth map using a cross-bilateral filter to generate the depth map. In some embodiments, although the depth map may be used to convert a 2D image into a 3D image, it is instead used to perform 2D image enhancement operations.

At block 340, a video post-processor of the video display system may enhance contrast of the 2D image using the depth map. Specifically, the contrast of the 2D image may be enhanced by an amount that is generated based on a high pass filter and depth values in the depth map.

At block 350, the video post-processor may enhance color of the 2D image using the depth map by first determining an ambient light amount for the 2D image. The ambient light amount may be deemed the background light amount for all the pixels in the 2D image. The ambient light amount may be ascertained by identifying a set of pixels in the 2D image having low light levels, and calculated based on the light levels of the set of pixels.

At block 360, for a pixel selected from the 2D image, the video post-processor may enhance the pixel's object light amount based on a depth value from the depth map and associated with the pixel. The pixel's object light amount may be derived by subtracting the ambient light amount from the pixel's original light value. The depth value may be retrieved from the depth map. In some embodiments, the video post-processor may adjust the pixel's object light amount to enhance the pixel's depth characteristic. That is, for a pixel close to the viewpoint, the enhancement makes the pixel appears closer. For a pixel far away from the viewpoint, the enhancement makes the pixel appears further.

At block 370, the video post-processor may calculated an enhanced color value for the pixel based on the enhanced object light amount and the ambient light amount. The color enhancement may enhance the depth perception of the 2D image. The enhanced 2D image may be displayed by a 2D or 3D display.

In some embodiments, the generating of the depth map performed by the blocks 320 and 330 may be conducted in parallel along with the performing of the image enhancements in blocks 340, 350, 360, and 370. That is, when the video post-processor enhances the 2D image using the depth map, the depth map generator may simultaneously generate a second depth map based on a second 2D image. The second depth map may subsequently be used by the video post-processor to enhance the second 2D image.

Figure 4:
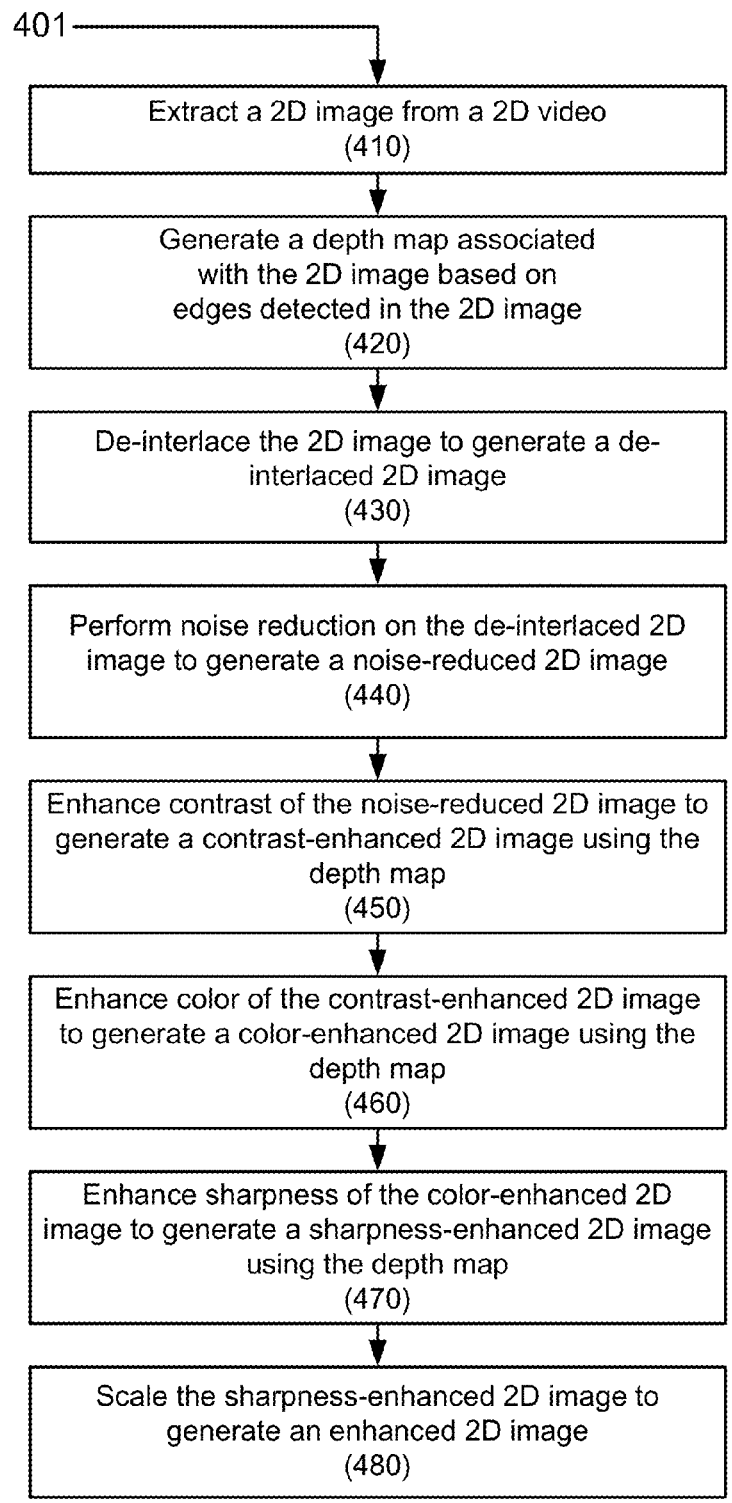
FIG. 4 shows a flow diagram of an illustrative embodiment of a process 401 for performing various image enhancement operations to a 2D image using a depth map, all arranged according to at least some embodiments of the present disclosure.

FIG. 4 shows a flow diagram of an illustrative embodiment of a process 401 for performing various image enhancement operations to a 2D image using a depth map. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations. In some embodiments, machine-executable instructions for the process 401 may be stored in memory, executed by a processing unit, and/or implemented in a video display system 120 of FIG. 1.

Relying on at least the aforementioned depth map generation and image enhancement approaches, the process 401 further includes additional image processing operations.

At block 410, a video decoder of a video display system may decode and extract a 2D image from a 2D video. At block 420, a depth map generator of the video display system may generate a depth map associated with the 2D image, and based on edges detected in the 2D image.

At block 420, a video post-processor of the video display system may de-interlace the 2D image to generate a de-interlaced 2D image. At block 440, the video post-processor may perform noise reduction on the de-interlaced 2D image to generate a noise-reduced 2D image.

At block 450, the video post-processor may enhance contrast of the noise-reduced 2D image to generate a contrast-enhanced 2D image using the depth map.

At block 460, the video post-processor may enhance color of the contrast-enhanced 2D image to generate a color-enhanced 2D image using the depth map.

At block 470, the video post-processor may enhance sharpness of the color-enhanced 2D image to generate a sharpness-enhanced 2D image using the depth map.

At block 480, the video post-processor may scale the sharpness-enhanced 2D image to generate an enhanced 2D image. The enhanced 2D image may then be used for displaying on a 2D or 3D display.

Thus, methods and systems for performing image enhancement using depth map have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non-recordable media (e.g., read-only memory (ROM), random access memory (RAM), magnetic disk storage media, optical storage media, flash memory devices, etc.)

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. A method to enhance a two-dimensional (2D) image, comprising:
    performing spatial filtering on the 2D image to generate an edge map;
    generating a weighted depth map based on a probability distribution of edges in the edge map;
    applying a weighted low-pass filter to the weighted depth map to generate an estimated depth map;
    filtering the estimated depth map using a cross-bilateral filter to generate a depth map, wherein the depth map can be used to convert the 2D image to a three-dimensional (3D) image; and
    enhancing contrast of the 2D image by
    applying a high-pass filter to a first contrast value of a pixel in the 2D image to generate a second contrast value, and
    applying a depth value from the depth map and associated with the pixel to the second contrast value.

2. The method as recited in claim 1, wherein the performing spatial filtering on the 2D image comprises detecting edges in the 2D image based on a defocus depth cue.

3. The method as recited in claim 1, wherein the enhancing comprises enhancing color of the 2D image.

4. The method as recited in claim 3, wherein the enhancing color of the 2D image comprises:

determining an ambient light amount for the 2D image;
for a pixel selected from the 2D image, enhancing object light amount of the pixel based on a depth value from the depth map and associated with the pixel; and
adjusting color of the pixel based on the enhanced object light amount and the ambient light amount.

5. The method as recited in claim 4, wherein the determining the ambient light amount comprises:
identifying a set of pixels in the 2D image that includes low light levels; and
determining the ambient light amount based on light levels associated with the set of pixels.

6. The method as recited in claim 4, wherein the enhancing the object light amount comprises adjusting the object light amount to enhance depth characteristic associated with the pixel.

7. The method as recited in claim 1, wherein the method is embodied in a non-transitory machine-readable storage medium as a set of instructions, which in response to execution by a processing unit, cause the processing unit to perform the method.

8. A method to enhance a two-dimensional (2D) video, comprising:
extracting a 2D image from the 2D video;
generating a depth map associated with the 2D image;
de-interlacing the 2D image to generate a de-interlaced 2D image;
performing noise reduction on the de-interlaced 2D image to generate a noise-reduced 2D image;
enhancing contrast of the noise-reduced 2D image to generate a contrast-enhanced 2D image;
enhancing color of the contrast-enhanced 2D image to generate a color-enhanced 2D image using the depth map, wherein the enhancing color includes
identifying a set of pixels in the contrast-enhanced 2D image having low light levels,
determining the ambient light amount based on light levels associated with the set of pixels,
for a pixel selected from the contrast-enhanced 2D image, enhancing object light amount of the pixel based on a depth value from the depth map and associated with the pixel, and
adjusting color of the pixel based on the enhanced object light amount and the ambient light amount;
enhancing sharpness of the color-enhanced 2D image to generate a sharpness-enhanced 2D image; and
scaling the sharpness-enhanced 2D image to generate an enhanced 2D image.

9. The method as recited in claim 8, wherein the enhancing contrast comprises:
applying a high-pass filter to a first contrast value of a pixel in the noise-reduced 2D image to generate a second contrast value; and
applying a depth value from the depth map and associated with the pixel to the second contrast value.

10. A system configured to enhance a two-dimensional (2D) video, comprising:
a video decoder configured to extract a 2D image from the 2D video;
a depth map generator configured to generate a depth map based on the 2D image, wherein the depth map can be used to convert the 2D image to a three-dimensional (3D) image; and
a video post-processor, coupled with the video decoder and the depth map generator, configured to enhance the 2D image using the depth map, wherein the video post-processor includes
a de-interlacing module configured to de-interlace the 2D image,
a noise-reduction module, coupled with the de-interlacing module, configured to perform noise-reduction on the 2D image,
a scaling module, coupled with the noise-reduction module, configured to scale the 2D image, and
a contrast enhancement module, coupled with the noise-reduction module, configured to enhance contrast of the 2D image using the depth map.

11. The system as recited in claim 10, wherein the depth map generator comprises an edge detector configured to generate an edge map based on the 2D image.

12. The system as recited in claim 10, wherein the depth map generator comprises a post-processing filter, coupled with the edge detector, configured to generate the depth map based on the edge map.

13. The system as recited in claim 10, wherein the video post-processor further comprises:
a color enhancement module, coupled with the contrast enhancement module, configured to enhance color of the 2D image using the depth map.

* * * * *